US006813627B2

(12) United States Patent
Hull et al.

(10) Patent No.: US 6,813,627 B2
(45) Date of Patent: *Nov. 2, 2004

(54) METHOD AND APPARATUS FOR PERFORMING INTEGER MULTIPLY OPERATIONS USING PRIMITIVE MULTI-MEDIA OPERATIONS THAT OPERATE ON SMALLER OPERANDS

(75) Inventors: James M. Hull, Saratoga, CA (US); Dale C. Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

This patent is subject to a terminal disclaimer.

(21) Appl. No.: 09/920,250

(22) Filed: Jul. 31, 2001

(65) Prior Publication Data

US 2003/0084083 A1 May 1, 2003

(51) Int. Cl.[7] .................................................. G06F 7/52
(52) U.S. Cl. ....................................... 708/620; 708/518
(58) Field of Search ................................ 708/518, 620, 708/622, 625, 626, 627

(56) References Cited

U.S. PATENT DOCUMENTS

| 5,675,526 | A | * | 10/1997 | Peleg et al. ................. 708/620 |
| 5,793,661 | A | * | 8/1998 | Dulong et al. .............. 708/603 |
| 5,862,067 | A | * | 1/1999 | Mennemeier et al. ....... 708/501 |
| 6,014,684 | A | * | 1/2000 | Hoffman ..................... 708/620 |
| 6,058,408 | A | * | 5/2000 | Fischer et al. .............. 708/322 |
| 6,282,556 | B1 | * | 8/2001 | Chehrazi et al. ............ 708/521 |
| 6,711,602 | B1 | * | 3/2004 | Bhandal et al. ............. 708/625 |

* cited by examiner

*Primary Examiner*—Chuong Dinh Ngo
(74) *Attorney, Agent, or Firm*—David A. Plettner

(57) ABSTRACT

Integer multiply operations using data stored in an integer register file are performed using multi-media primitive instructions that operate on smaller operands. The present invention performs a multiply operation on a 32-bit or 64-bit value by performing multiply operations on a series of smaller operands to form partial products, and adding the partial products together. Data manipulation instructions are used to reposition 16-bit segments of the 32-bit operands into positions that allow the multi-media parallel multiply instructions to compute partial products, and the partial products are then added together to form the result. In every embodiment, the present invention achieves better latencies than the prior art method of performing integer multiply operations provided by the IA-64 architecture.

20 Claims, 5 Drawing Sheets

7: ADD      T7=T4,T5

32-BIT VALUE IN 64-BIT REGISTER T4

32-BIT VALUE IN 64-BIT REGISTER T5

32-BIT VALUE IN 64-BIT REGISTER T7

8: ADD      RZ=T6,T7

32-BIT VALUE IN 64-BIT REGISTER T6

32-BIT VALUE IN 64-BIT REGISTER T7

32-BIT VALUE IN 64-BIT REGISTER RZ

METHOD AND APPARATUS FOR PERFORMING INTEGER MULTIPLY OPERATIONS USING PRIMITIVE MULTI-MEDIA OPERATIONS THAT OPERATE ON SMALLER OPERANDS

FIELD OF THE INVENTION

The present invention relates to performing integer multiply operations in computer systems. More specifically, the present invention relates to performing integer multiply operations using instructions that perform several smaller multiply operations in parallel.

DESCRIPTION OF THE RELATED ART

In the art of computing, central processing units (CPUs) perform tasks by executing instructions that are part of an instruction set. Some of these instructions are dedicated to performing basic mathematical operations, including integer multiply operations.

The operations performed by instructions are implemented by logic gates on an integrated circuit (IC) die. The logic gates required to implement some operations, such as integer addition operations, tend to consume a relatively small area of the die. On the other hand, the logic gates required to implement integer multiply operations tend to consume a significantly larger area of the die. Accordingly, it is important to optimize the design of the circuits that perform integer multiply operations to minimize the die area consumed by these circuits.

CPUs typically have two types of functional units for performing mathematical operations. The first type of functional unit is the integer unit, which is responsible for performing integer (or alternatively, fixed-point) mathematical operations. The second type of functional unit is the floating-point unit, which is responsible for performing floating-point operations. The two functional units typically reside on distinct areas of the die, and each functional unit typically has access to its own register file. Separating the two functional units allows each unit to be optimized to perform the functions it supports.

Furthermore, there is typically little interaction between the integer and floating-point units, so there is little penalty incurred by separating the units.

Historically, integer multiplication has been considered important enough, from a performance perspective, to provide instructions in the instruction set that explicitly support integer multiply operations. However, integer multiplication has traditionally not been considered important enough to provide a full implementation of a 32-bit or 64bit integer multiplier in the integer unit, especially in reduced instruction set computer (RISC) CPUs. As discussed above, such an integer multiplier unit consumes a large area on the die, and this die area can typically be better used to provide other functions.

One prior art technique for supporting integer multiply instructions is to provide a smaller integer multiplier (such as an 8-bit or 16-bit multiplier) in the integer unit. The smaller multiplier computes sums of smaller products to produce a 32-bit or 64-bit results, and uses multiple cycles to compute the result. This approach has the advantage of consuming a relatively small area on the die. However, the smaller multiplier is nonetheless only useful for performing integer multiply operations, and is relatively slow. One CPU that uses this approach is the MIPS® R3000® RISC processor, which is a product of MIPS Technologies, Inc.

Another prior art technique is to use the floating-point unit to perform integer multiply operations. Typically this approach requires that a data path be provided between the integer register file and the floating-point register file. To perform an integer multiply operation, the operands are transferred from the integer register file to the floating-point register file via the data path, a multiplier in the floating-point unit is used to perform the integer multiply operation using operands from and storing the result to the floating-point register file, and the result is transferred from the floating-point register file back to the integer register file. This approach is used by CPUs adhering to the PA-RISC architecture, which are products of the Hewlett-Packard Company, and CPUs adhering to the IA-64 architecture, which are products of Intel Corporation. The IA-64 architecture was developed jointly by Hewlett-Packard Company and Intel Corporation.

This approach has the advantage of using existing multiplier circuits in the floating-point unit, so little extra area on the die is required. Furthermore, floating-point units typically include full multiplier implementations capable of performing 32-bit or 64-bit multiply operations in relatively few clock cycles. However, this approach also has several disadvantages. Since the integer and floating-point units are designed independently, each unit is optimized for its own operations and the data path between the two units is often not very fast. Another disadvantage is that floating-point registers, which could be used to perform other tasks, are needed for intermediate computation. Another disadvantage of using the floating-point unit is power. The floating-point unit typically uses a lot of power, and if a program does no real floating point work, many modern processors power down the floating-point unit. Thus, powering the floating-point unit up for an occasional integer multiply operation consumes significant power.

Code Segment A illustrates how an integer multiply operation is typically performed in a CPU adhering to the IA-64 architecture. In Code Segment A, the integers to be multiplied are stored in registers r32 and r33, and the result is placed in r34.

| Code Segment A | | |
|---|---|---|
| 1: | setf.sig | f6 = r32 |
| 2: | setf.sig | f7 = r33 |
| 3: | xmpy.l | f6 = f6, f7 |
| 4: | getf.sig | r34 = f6 |

The instructions shown in Code Segment A are discussed in greater detail in the Intel®IA-64 Architecture Software Developer's Manual, Volume 3: Instruction Set Reference, Revision 1.1, which was published in July of 2000 and is hereby incorporated by reference. Furthermore, the latencies associated with these instructions on an Itanium™ CPU are discussed in the Itanium™ Processor Microarchitecture Reference for Software Optimization, which was published in August 2000 and is hereby incorporated by reference. The Itanium™ processor is the first CPU to adhere to the IA-64 architecture.

Returning to Code Segment A, at line 1 the instruction "setf.sig" is used to transfer the contents of general register 32 (r32) to the significand field of floating point register 6 (f6). Similarly, at line 2 the contents of r33 are transferred to the significand field of f7. The "setf.sig" instructions of lines 1 and 2 can be issued during the same clock cycle, and have a latency of nine cycles. Accordingly, if the "xmpy.1"

instruction of line 3 is scheduled closer than nine cycles from the "setf.sig" instructions, the pipeline will delay execution of the "xmpy.1" instruction until nine cycles have elapsed.

At line 3, the instruction "xmpy.1" instruction treats the contents of the significand fields of f6 and f7 as signed integers, and multiplies the contents together to produce a full 128-bit signed result, with the least significant 64-bits of the result being stored in the significand field of f6. The "xmpy.1" instruction has a latency of eight cycles, so if the "getf.sig" instruction of line 4 is scheduled closer than seven cycles from the "xmpy.1" instruction, the pipeline will delay execution of the "getf.sig" instruction until seven cycles have elapsed.

Finally, the "getf.sig" instruction of line 4 transfers the significand field of f6 to r34. The "getf.sig" instruction has a latency of two cycles, after which the result of the multiply operation is available in r34.

Note that the integer multiply operation shown of Code Segment A has a total latency of 19 cycles, which is relatively slow. Although the integer multiply operation has a relatively long latency, many multiply operations can be pending in the pipeline, thereby allowing a multiplication result to be generated every few cycles.

This latency is not an issue for applications that perform many integer multiply operations in a sequence. In such applications, modulo scheduling allows the pipeline to be loaded with many multiply operations, thereby hiding the latency associated with any particular multiply operation. However, latency is an important issue for many other types of applications. For example, consider a database application that must perform a single integer multiply operation to calculate an index before data can be retrieved from an array in memory. In this example, the latency of the multiply operation is fully exposed and seriously impacts the speed at which data can be retrieved from the array in memory. Accordingly, the 19 cycle latency associated with integer multiply operations may prove to be a serious performance issue in Itanium™-optimized applications.

SUMMARY OF THE INVENTION

The present invention is a method and apparatus for performing integer multiply operations from data stored in the integer register file using multi-media primitive instructions that operate on smaller operands. Basically, the present invention performs 32-bit or 64-bit integer multiply operations using multi-media parallel multiply instructions that perform several 16-bit multiply operations in parallel, along with several other multi-media primitive instructions. By using the multi-media instructions of an Itanium™ (or other IA-64 architecture) CPU, the present invention can perform a full 64-bit integer multiply operation with a latency of 11–14 clock cycles, and a full 32-bit integer multiply operation in 7–10 clock cycles. On an Itanium™ CPU, the present invention provides a latency improvement of up to 58% for a full 32-bit integer multiply operation, and up to a 37% improvement for a full 64-bit integer multiply operation, compared to the prior art method illustrated in Code Segment A above. By using multi-media primitive instructions, operands do not need to be transferred to the floating-point unit and the results do not need to be retrieved from the floating point unit, thereby avoiding the combined 11-cycle latency of the "setf.sig" and "getf.sig" instructions.

The present invention performs a multiply operation on a 32-bit or 64-bit value by performing multiply operations on a series of smaller operands to form partial products, and adding the partial products together. Data manipulation instructions are used to reposition 16-bit segments of the 32-bit operands into positions that allow the multi-media parallel multiply instructions to compute partial products, and the partial products are then added together to form the result.

Six embodiments of the present invention are disclosed. The first embodiment performs a 32-bit by 32-bit multiply operation that produces a 32-bit result The second embodiment performs an unsigned 32-bit by 32-bit multiply operation that produces a 64-bit unsigned result. The third embodiment performs a signed 32-bit by 32-bit multiply operation that produces a signed 64-bit result. The fourth embodiment performs a 64-bit by 64-bit multiply operation that produces a 64-bit result. The fifth and sixth embodiments mirror the functionality of the first and third embodiments, respectively, but are somewhat more efficient when the input operands are produced by an integer instruction in the immediately preceding cycle.

In every embodiment, the present invention achieves better latencies than the prior art method of performing integer multiply operations provided by the IA-64 architecture. Also, the prior art method and the method of the present invention are not mutually exclusive, and can be scheduled to execute concurrently. Therefore, the present invention has the ability to increase the integer multiplication bandwidth of an IA-64 CPU.

The present invention can also provide an improvement in power consumption, which is especially important in applications such as laptop computers. Typically, the floating-point unit uses a lot of power, and if a program does no real floating point work, IA-64 CPUs power down the floating-point unit. Therefore, powering the floating-point unit up for an occasional integer multiply operation consumes significant power. The present invention can perform a 32-bit or 64-bit multiply operation without powering up the floating-point unit.

The present invention does not use any circuits that are dedicated exclusively to 32-bit or 64-bit integer multiply operations. Since all of the circuits used by the present invention have other multi-media functions, these circuits are more generally useful and therefore provide a better balanced CPU design. Since minimizing die area is essential to achieving higher CPU clock frequencies, and therefore higher performance, it is always desirable to include as few circuits as possible, with each circuit providing as much functionality as possible.

DETAILED DESCRIPTION OF THE PREFERRED EMBODIMENTS

Figure 1:
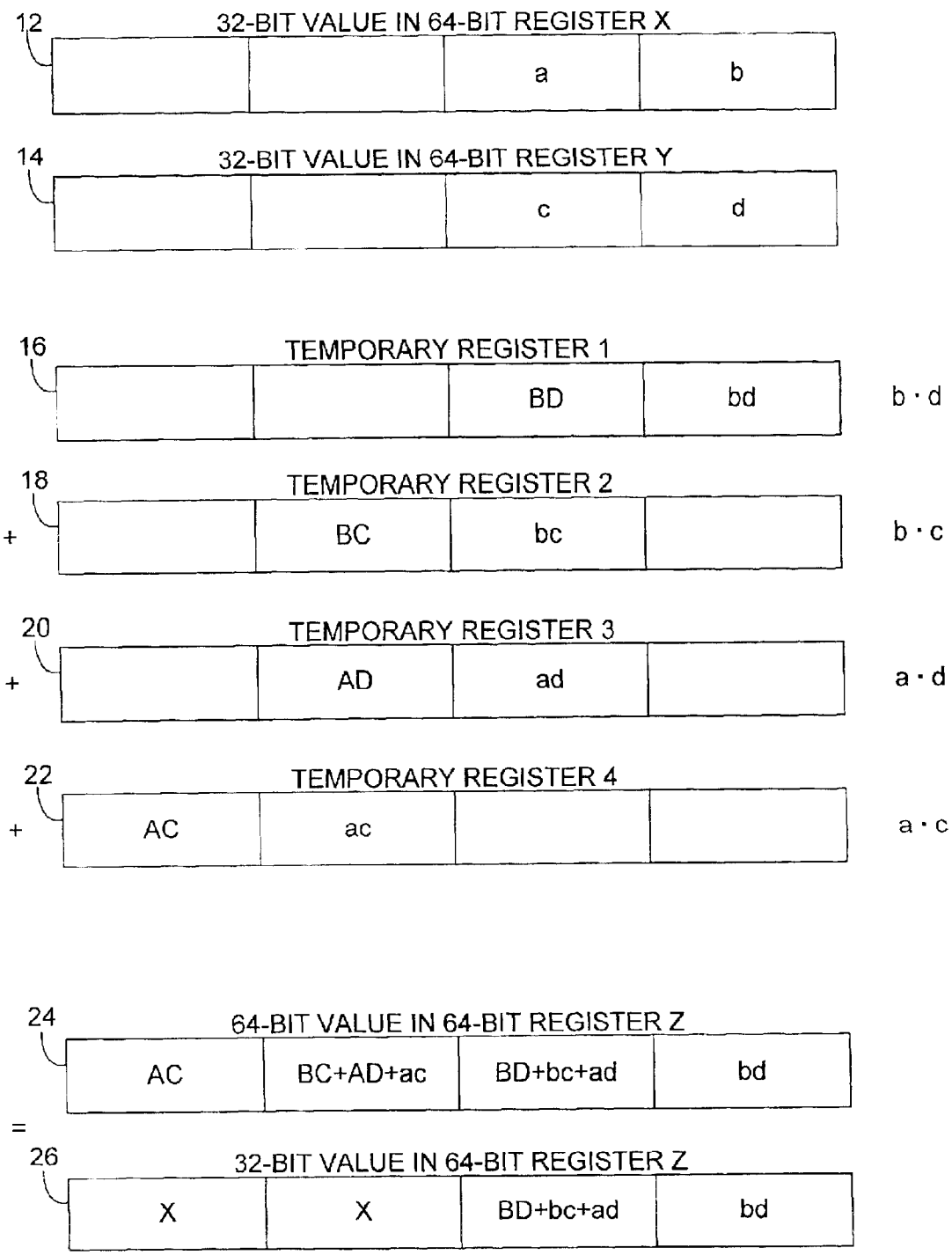
FIG. 1 shows a prior art method of multiplying two unsigned 32-bit values by summing a series of 16-bit multiply operations.

The present invention is a method and apparatus for performing integer multiply operations from data stored in the integer register file using multi-media primitive instructions that operate on smaller operands. Basically, the present invention performs 32-bit or 64-bit integer multiply operations using multi-media parallel multiply instructions that perform several 16-bit multiply operations in parallel, along with several other multi-media primitive instructions. By using the multi-media instructions of an Itanium™ (or other IA-64 architecture) CPU, the present invention can perform a full 64-bit integer multiply operation with a latency of 11–14 clock cycles, and a full 32-bit integer multiply operation in 7–10 clock cycles. On an Itanium™ CPU, the present invention provides a latency improvement of up to 58% for a full 32-bit integer multiply operation, and up to a 37% improvement for a full 64-bit integer multiply operation, compared to the prior art method illustrated in Code Segment A above.

As mentioned above, the present invention is implemented using multi-media primitive instructions. In recent years, multi-media operations have become increasingly important. These operations are typically performed with fixed-point operands. Since integer multiply operations are a common operation, multi-media units are often equipped with multiplier circuits. However, multi-media data is typically smaller than standard integer data (i.e., 8, 12 or 16 bits, as opposed to 32 or 64 bits). Therefore, these multiplier units only support multiply operations for these smaller operands.

In the Intel IA-32 architecture, multi-media multiply instructions are processed by the floating-point unit. However, in the IA-64 architecture, multi-media multiply instructions are processed by the integer unit. The present invention exploits this fact by using IA-64 multi-media multiply instructions to perform 32-bit and 64-bit integer multiply operations. By itself, the fact that the operands do not need to be transferred to the floating-point unit and the results do not need to be retrieved from the floating point unit provides an 11-cycle advantage in an Itanium™ CPU, since 11 cycles is the combined latency of the "setf.sig" and getf.sig" instructions, as discussed above.

The present invention employs the following IA-64 multi-media instructions:

pmpyshr2.u Parallel Multiply and Shift Right—Multiply four pairs of unsigned 16-bit values packed into two 64-bit integer registers, delivering four 16-bit results into a single 64-bit integer register, where each result is selectively either the least-significant 16 bits of each unsigned product, or the most significant 16 bits of each unsigned product.

mux2 Select four 16-bit values from a single 64-bit integer register, and rearrange them, possibly duplicating one or more of these 16-bit values to produce four 16-bit results packed into a single 64-bit integer register.

unpack2.1 Select two 16-bit values from one 64-bit integer register, two 16-bit values from another 64-bit integer register, rearrange the 16-bit values and produce four 16-bit results packed into a single 64-bit integer register mix4 Select one 32-bit value from one 64-bit integer register, one 32-bit value from another 64-bit integer register, arrange these and produce two 32-bit results packed into a single 64-bit integer register.

padd2 Parallel Add—Add four pairs of 16-bit values packed into two 64-bit integer registers, delivering four 16-bit sums into a single 64-bit integer register.

In addition to these multi-media instructions, the present invention employs the following standard integer computation instructions:

and Performs an AND operation between two 64-bit integer register values to produce a result in a single 64-bit register.

add Adds two 64-bit integer register values to produce a result in a single 64-bit register.

sub Subtracts two 64-bit integer register values to produce a result in a single 64-bit register.

shl Performs a shift-left on a 64-bit integer register value.

shr Performs a shift-right on a 64-bit integer register value.

dep.z Deposits a right-justified field of a first 64-bit integer register value into a field of zeroes at an arbitrary position of a second 64-bit integer register, with the result being stored in a third 64-bit integer register.

cmp4 Compare two 64-bit integer register values.

mov Copy a value from one register to another.

Additional documentation for these instructions can be found in the Intel® IA-64 Architecture Software Developer's Manual, Volume 3: Instruction Set Reference Revision 1.1, which was published in July of 2000 and is incorporated by reference above.

The present invention performs a multiply operation on a 32-bit or 64-bit value by performing multiply operations on a series of smaller operands to form partial products, and adding the partial products together. FIG. 1 shows a prior art method 10 of multiplying two 32-bit values using 16-bit multiply operations. As used herein, single lower case letters are used to represent 16-bit values, two lower case letters are used to represent the lower 16-bits of a 32-bit result formed by multiplying two 16-bit values, and two upper case letters are used to represent the upper 16-bits of a 32-bit result formed by multiplying two 16-bit values. Accordingly, multiplying the 16-bit value "a" with the 16-bit value "b" results in the 32-bit value "ABab".

In FIG. 1, at reference numeral 12, 64-bit register X holds a 32-bit value represented by "a" and "b", and at reference numeral 14, 64-bit register Y holds a 32-bit value represented by "c" and "d". At reference numeral 16, the 16-bit quantity "b" is multiplied by the 16-bit quantity "d" to form the 32-bit quantity "BDbd", which is stored in temporary register 1.

Next, at reference numeral 18, the 16-bit quantity "b" is multiplied by the 16-bit quantity "c" to form the 32-bit quantity "BCbc". Since "c" represents the value stored in bit positions 16–31 of register Y, the result "BCbc" stored in temporary register 2 is shifted left by 16-bits. Similarly, at reference numeral 20, the 16-bit quantity "a" is multiplied by the 16-bit quantity "d" to form the 32-bit quantity "ADad". Since "a" represents the value stored in bit positions 16–31 of register X, the result "ADad" stored in temporary register 3 is shifted left by 16-bits. Finally, at reference numeral 22, the 16-bit quantity "a" is multiplied by the 16-bit quantity "c" to form the 32-bit quantity "ACac". Since both "a" and "c" represent the values stored in bit positions 16–31 of registers X and Y, respectively, the result "ADad" stored in temporary register 4 is shifted left by 32-bits.

Reference numeral 24 shows the result stored in 64-bit register Z. Note that the highest 16-bits (bit positions 48–63) are equivalent to "AC", the next 16-bits (bits 32–47) are equivalent to "BC+AD+ac", the next 16-bits (bits 16–31) are equivalent to "BD+bc+ad", and the lowest 16bits (bits 0–15) are equivalent to "bd". Reference numeral 26 is similar, except that reference numeral 26 represents a 32-bit value so the upper 32-bits (bits 32–63) are "don't cares". The letter "X" will be used herein to refer to "don't cares".

In accordance with the present invention, multi-media parallel multiply instructions are used to compute partial products shown in FIG. 1. Since the multi-media instructions are executed by an integer unit in the IA-64 architecture, the latency associated with transferring operands and results between the integer unit and floating-point unit register files is avoided.

Six examples of the present invention are included in Appendixes 1–6. Appendixes 1 and 5 include IA-64 code that performs a 32-bit by 32-bit multiply operation that produces a 32-bit result. It does not matter whether the operands are signed or unsigned since the result is truncated to 32 bits. Appendix 2 includes IA-64 code that performs an unsigned 32-bit by 32-bit multiply operation that produces an unsigned 64-bit result. Appendixes 3 and 6 include IA-64 code that performs a signed 32-bit by 32-bit multiply operation that produces a signed 64-bit result. Finally, Appendix 4 includes IA-64 code that performs a 64-bit by 64-bit multiply operation that produces a 64-bit result. Similar to the 32-bit multiply operation shown in Appendixes 1 and 5, it does not matter whether the operands are signed or unsigned since the result is truncated to 64 bits. Each of these appendixes will be discussed below. However, before discussing Appendix 1, first consider a simplified version of the code contained in Appendix 1, along with FIGS. 2A–2D.

Code Segment B shows a simplified set of instructions for performing a 32-bit by 32-bit multiply operation that produces a 32-bit result.

| | Code Segment B | |
| --- | --- | --- |
| 1: | pmpyshr2.u | t1 = rx, ry, 16 |
| 2: | mux2 | t2 = rx, 0xE0 |
| 3: | unpack2.1 | t3 = ry, r0 |
| 4: | pmpyshr2.u | t4 = t2, ry, 0 |
| 5: | unpack2.1 | t5 = t1, r0 |
| 6: | pmpyshr2.u | t6 = rx, t3, 0 |
| 7: | add | t7 = t4, t5 |
| 8: | add | rz = t6, t7 |

Figure 2A:
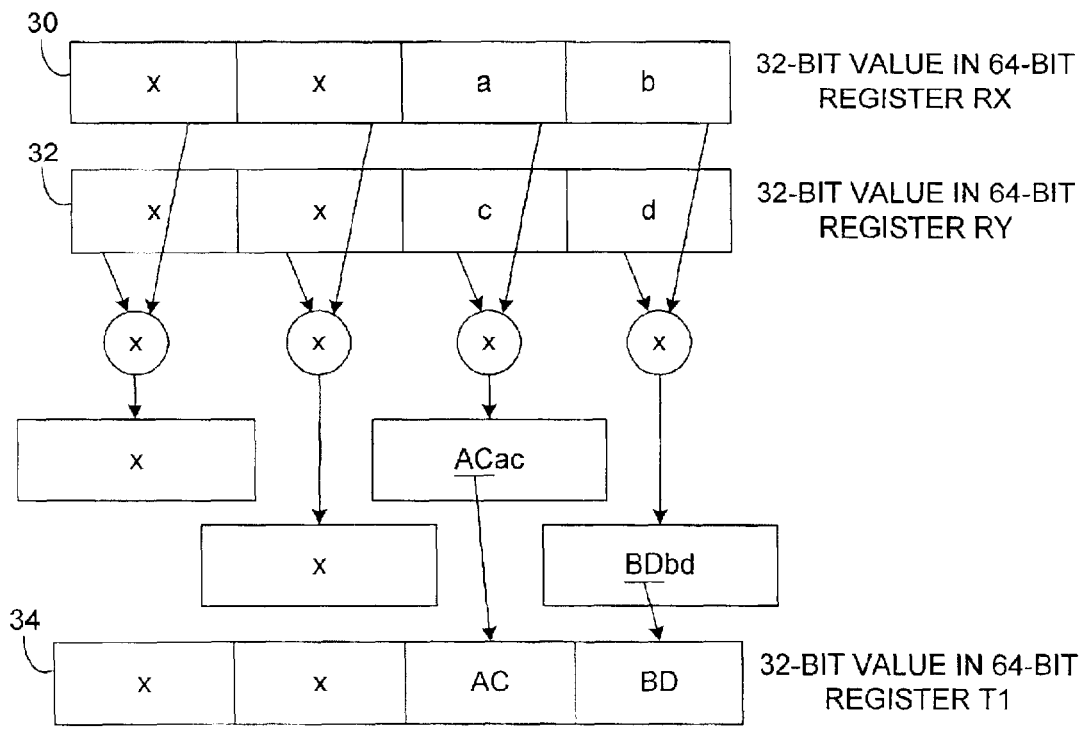
FIGS. 2A–2D show the data flow of a code sequence in accordance with the present invention.
Figure 2A:
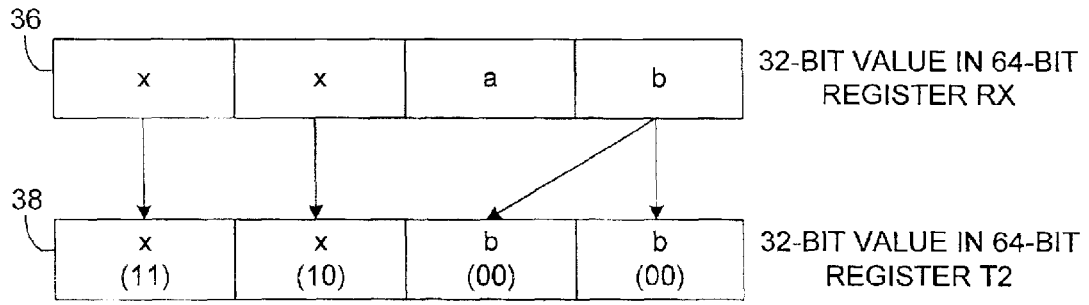

With reference to FIG. 2A, Instruction 1 is a parallel multiply and shift right instruction. At reference numeral 30, "a" and "b" are in register rx and at reference numeral 32 "c" and "b" are in register ry. This instruction multiplies "a" and "c" to produce "ACac", and "b" and "d" to produce "BDbd", with the results being stored in 32-bit intermediate registers. Since this instruction specifies a right shift of 16 bits, at reference numeral 34 the 16-bit value BD is stored in the lower 16 bits (bits 0–15) of register t1 and the 16-bit value "AC" is stored at bit positions 16–31.

Figure 2B:
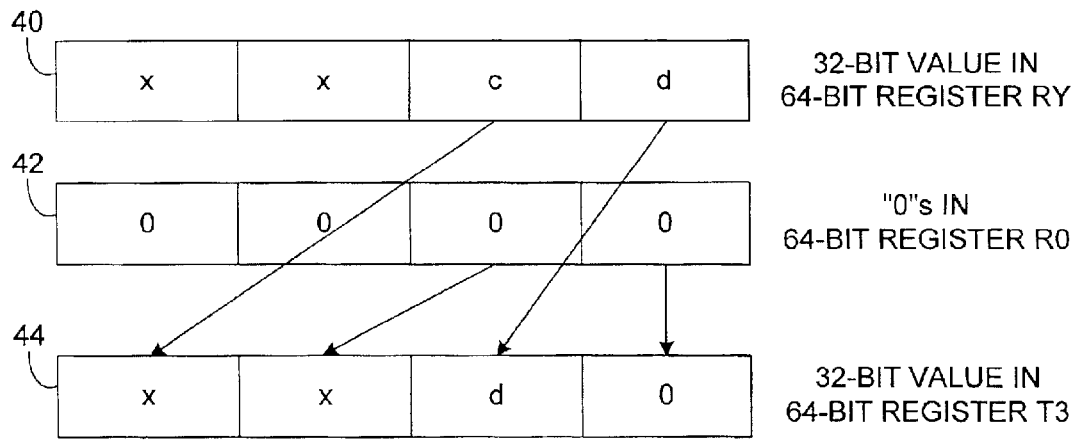
Figure 2B:
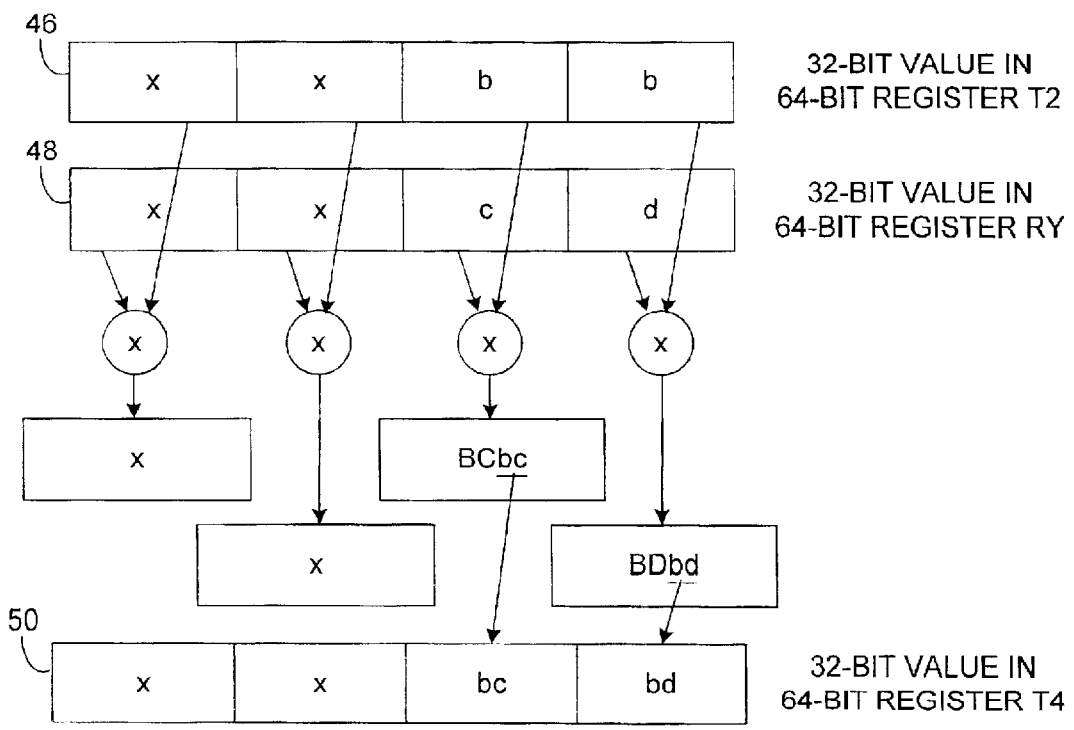

Instruction 2 is a mux instruction. At reference numerals 36 and 38, instruction 2 copies "b" from the lower 16 bits of register RX to bit positions 0–15 and 16–31 of register t2. With reference to FIG. 2B, instruction 3 is an unpack instruction. Note that in the IA-64 architecture, register r0 at reference numeral 42 has a value of "0". The effect of this instruction is to take the "d" value stored in the lower 16 bits of register ry, shift "d" left 16 bits, and store the result in register t3, as shown in FIG. 2B.

Note that in FIG. 1, bits 0–15 of register Z contain "bd", and bits 16–31 include "bc" as partial product that is included in the sum. Instruction 4, which is a parallel multiply and shift right instruction, computes these values by performing two 16-bit multiply operations in parallel. At reference numeral 46, register t2 contain "b" and "b", and at reference numeral 48, register ry contains "c" and "d". This instruction multiplies "b" and "c" to produce "BCbc", and "b" and "d" to produce "BDbd", with the results being stored in 32-bit intermediate registers. Since this instruction does not specify a right shift, at reference numeral 50 the 16-bit value "bd" is stored in the lower 16 bits (bits 0–15) of register t4 and the 16-bit value "bc" is stored at bit positions 16–31.

Figure 2C:
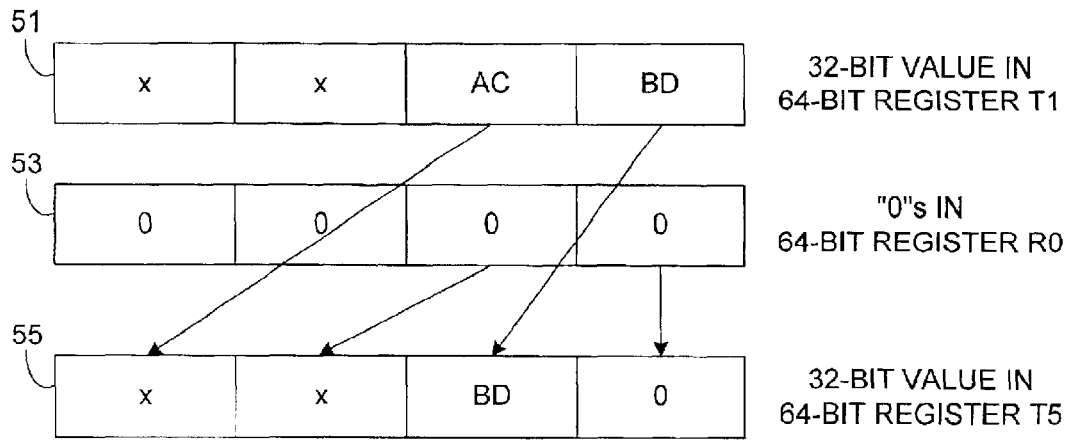
Figure 2C:
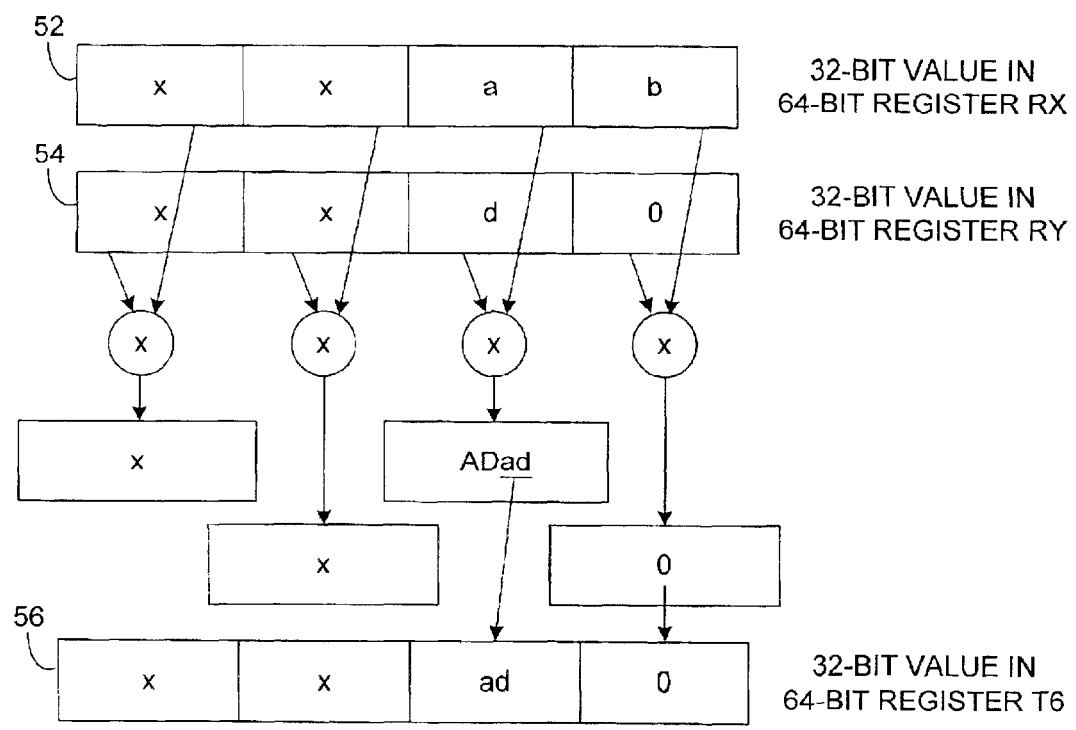

With reference to FIG. 2C, instruction 5 is another unpack instruction. This instruction takes the "BD" value stored in the lower 16 bits of register t1 at reference numeral 51, shifts "BD" left 16 bits, and stores the result in register t5 at reference numeral 55. Instruction 6 is another parallel multiply and shift right instruction. At reference numeral 52, register rx contains "a" and "b", and at reference numeral 54, register ry contains "d" and "0". This instruction multiplies "a" and "d" to produce "ADad", and "b" and "0" to produce "0", with the results being stored in 32-bit intermediate registers. Since this instruction does not specify a right shift, at reference numeral 56 the 16-bit value "0" is stored in the lower 16 bits (bits 0–15) of register t6 and the 16-bit value "ad" is stored at bit positions 16–31.

Figure 2D:
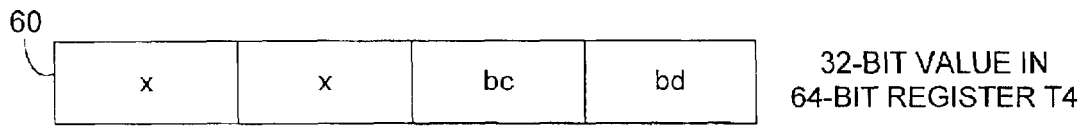
Figure 2D:
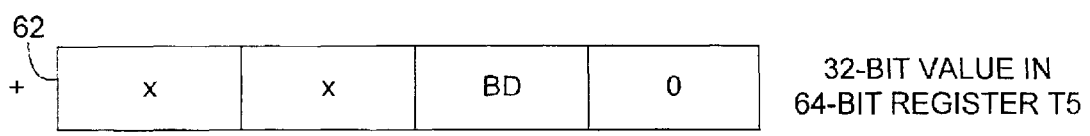
Figure 2D:
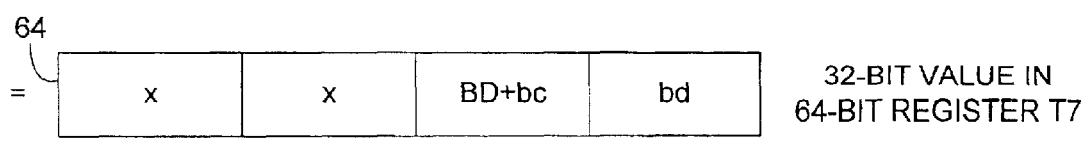
Figure 2D:
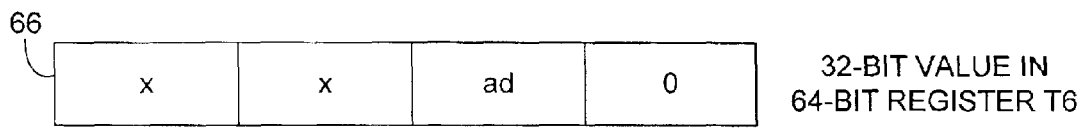
Figure 2D:
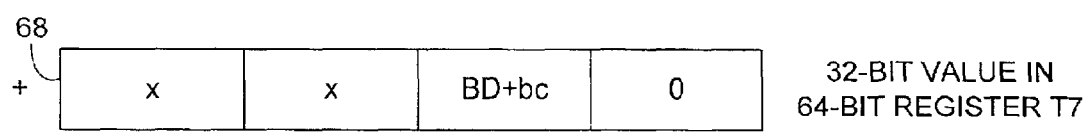
Figure 2D:
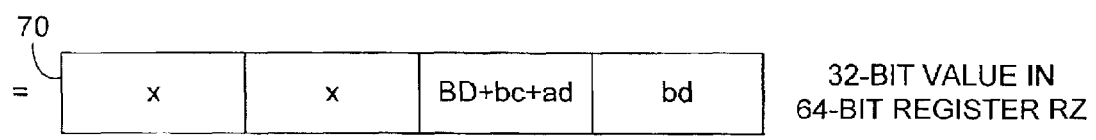

At this point, registers t4, t5, and t6 contain all the partial products in the correct bit positions shown at reference numeral 26 of FIG. 1. With reference to FIG. 2D, instruction 7 adds the contents of register t4 (reference numeral 60) to the contents of register t5 (reference numeral 62), and stores the results in register t7 (reference numeral 64). Finally, instruction 8 adds the contents of register t6 (reference numeral 66) to the contents of register t7 (reference numeral 68), and stores the results in register rz (reference numeral 70). Note that the final result in register rz corresponds to the result shown at reference numeral 26 in FIG. 1.

FIGS. 2A–2D illustrate the present invention. Data manipulation instructions are used to reposition 16-bit segments of the 32-bit operands into positions that allow the multi-media parallel multiply instructions to compute partial products, and the partial products are then added together to form the result.

As mentioned above, six examples of the present invention are included in Appendixes 1–6. Note that to avoid confusion in the discussion below, the line numbers in each appendix are unique. The code in the appendixes is annotated with appropriate comments, so the code will not be discussed in great detail. The code is presented in IA-64 assembly language.

As discussed above, the Itanium™ processor is the first CPU to adhere to the IA-64 architecture. However, the second processor to adhere to the IA-64 architecture is code named McKinley. In general, McKinley will be faster than Itanium™, and many of the IA-64 instructions have lower latencies when executed by a McKinley CPU. These differences are reflected by the cycle number in parenthesis in the appendixes.

In the Itanium™ and McKinley implementations of the IA-64 architecture, there are certain bypass latencies that must be observed when a result is computed by one instruction class and consumed by another instructions class. This is discussed in greater detail in section 3.4 of the Itanium™ Processor Microarchitecture Reference for Software Optimization, which is incorporated be reference above. In general, the latencies of interest herein are the "integer to integer" (one cycle) latency, the "multi-media to multi-media" (two cycles) latency, the "integer to multi-media" (three cycles) latency, and the "multi-media to integer" (four cycles, with possible penalty in an Itanium™ CPU) latency. One of the idiosyncrasies of the Itanium™ CPU is that if an integer instruction that consumes an integer is scheduled less than four cycles from a multi-media instruction operation that produces the integer, the pipeline is flushed and a ten cycle penalty is incurred. In a McKinley CPU, the integer operation is simply stalled until four cycles have elapsed.

The codes segments in Appendixes 1–4 are optimized to have the lowest latency for situations were the input operands have been available for a sufficient period of time to satisfy all bypass latencies. However, in practice, if the instruction immediately preceding a code segment produced an input operand, then an additional one or two cycle latency will be incurred (either by stalling or scheduling an unrelated instruction). For example, the first instruction cycle of Appendix 1 at line 63 includes a multi-media instruction. If a multi-media instruction in the instruction cycle immediately preceding the multi-media instruction at line 63 produced one of the input operands, a one cycle delay must be inserted to satisfy the "multi-media to multi-media" bypass latency. If the immediately preceding instruction is an integer instruction, a two cycle delay must be inserted to satisfy the "integer to multi-media" bypass latency. Similarly, in Appendix 3, the first instruction cycle includes an integer instruction at line 297 and a multi-media instruction at line 299. If a multi-media instruction in the instruction cycle immediately preceding the integer instruction at line 297 produced one of the input operands, a three cycle delay must be inserted to satisfy the "multi-media to integer" bypass latency. If the immediately preceding instruction is an integer instruction, a two cycle delay must be inserted to satisfy the "integer to multi-media" bypass latency.

As discussed above, latency is an important issue for many types of applications, such as a database application that must perform a single integer multiply operation to calculate an index before data can be retrieved from an array in memory. Most often, at least one input operand will be produced by an integer instruction in the instruction cycle immediately preceding the first instruction cycle of the code segments of the present invention, and it is desirable to have the multiply operation result as soon as possible.

The code segments shown in Appendixes 5 and 6 mirror the functionality of the code segments shown in Appendixes 1 and 3, respectively, and are optimized for the situation where the input operands are produced by integer instructions in instruction cycles immediately preceding the code segments. The code segments of Appendixes 5 and 6 have only integer instructions in the first two instruction cycles, thereby allowing "integer to multi-media" bypass latencies to be satisfied before encountering the first multi-media instruction of the code segment, while getting some work done using integer instructions without stalling or needing to schedule unrelated instructions. Note that the code of Appendix 5 has a lower latency than the code of Appendix 1 when the input operands are produced by integer instructions in cycles immediately preceding the code. Also note that the code segment of Appendix 6 has the same latency, but consumes fewer instructions and registers than the code segment of Appendix 3 when the input operands are produced by integer instructions in cycles immediately preceding the code segments.

Appendix 1 includes IA-64 code that performs a 32-bit by 32-bit multiply operation that produces a 32-bit result, as in Code Segment B and FIGS. 2A–2D. It does not matter whether the operands are signed or unsigned, since the result will only be the lower 32-bits of the product. Note that the code shown in Appendix 1 is a more complete version of Code Segment B. The notation used to illustrate how the result is formed from the sum of partial products is the same as above. Furthermore, the comments after each instruction indicate the result produced by the instruction. For example, the "mux2" instruction at line 64 copies the value "b" to bits 0–15 and 16–32 of the register t2.

Note that lines 47–57 show a virtual-to-physical register mapping, with many of the physical register being recycled. Also note that the comments indicate which functional unit can execute a particular instruction. For example, at line 63, the "pmpyshr2.u" instruction can only be executed by I-unit 0, while the "mux2" instruction at line 64 can be executed by either I-unit 0 or 1. Similarly, the "add" instruction at line 92 must be executed by the A-unit.

A regular 64-bit add instruction, which is an integer instruction, only has a latency of one clock cycle, while a parallel add instruction, which is a multi-media instruction, has a latency of two cycles. Therefore, if the result of the code shown in Appendix 1 is going to be consumed by a multi-media instruction, it is more efficient to use the slower parallel add instruction and not incur an eight cycle latency moving the data to and from the integer unit. These two factors are addressed by the compiler directives at lines 76, 82, 83, 90, and 96.

Accordingly if the result is going to be consumed by a multi-media instruction, then the compiler directive at line 76 causes the parallel add instructions at lines 78 and 81 to compute the result. However, if the result is going to be consumed by an integer instruction, then the compiler directive at line 83 determines whether the CPU is an Itanium™ CPU. If it is, then the to "nop" instructions at lines 85 and 88 are executed to avoid the ten cycle pipeline flush penalty discussed above. These instructions are not executed if the CPU is a McKinley CPU. Finally, the result is computed by the two integer add instructions at lines 92 and 95.

Appendix 2 includes the code required to multiply two unsigned 32-bit values to produce a 64-bit unsigned result. Note that the sum of the partial products produced by this code, as shown in the comment at line 140, corresponds with register Z at reference numeral 24 of FIG. 1.

Appendix 3 includes the code required to multiply two signed 32-bit values to produce a signed 64-bit result. The signed values are stored in a 2's complement format. As discussed in the comments of lines 247–265, the sum of the partial products is the same as in the code shown in Appendix 2, except that a correction is applied if either or both of the operands is negative. Note that even though there are more instructions in the signed multiply operation of Appendix 3 compared to the unsigned multiply operation of Appendix the code of Appendix 3 is able to execute in the same number of cycles as the code of Appendix 2 by effectively using predication and the large number of execution resources of IA-64 CPUs.

Finally, Appendix 4 includes the code required to multiply two 64-bit integers together to form a 64-bit result. It does not matter whether the operands are signed or unsigned, since the result will only be the lower 64-bits of the product. Basically, the code shown in Appendix 4 expands the same sum of partial products technique shown in FIG. 1 to include 64-bit quantities.

Table 1 below compares the latencies and resources associated with the embodiments of the present invention shown in Appendixes 1, 2, 3, and 4, and the prior art multiplication code shown in Code Segment A. The latencies shown in Table 1 that are not enclosed in parenthesis assume that the input operands have been available for a sufficient period of time to satisfy all bypass latencies. The latencies shown in parenthesis assume that the input operands have been produced by an integer instruction in the instruction cycle immediately preceding the code segment. Note that the latencies will be different if the input operands have been produced by a multi-media instruction in the instruction cycle immediately preceding the code segment, as discussed above.

For Appendixes 2–4, all latencies shown assume that the result will be consumed by an integer instruction. If the result is to be consumed by a multi-media instruction, two cycles must be added to satisfy the bypass latency. However, for the code segment of Appendix 1, if the result is to be consumed by a multi-media instruction, multi-media "padd" instructions are used to form the final sum, thereby avoiding the two cycle penalty, as discussed above. This code is selected by the compiler variable "MM_RESULT", and is shown starting at line in Appendix 1.

additional option to zero-extend the result without introducing any latency, but using one additional instruction. The alternate portions of code to allow a zero-extended result are controlled by the compiler variable ZERO-EXT in Appendix 5. Note that the instructions in instruction cycles 0 and 1 (lines 550–555) are integer instructions, and the first multi-media instruction occurs at line 558 in instruction cycle 2, thereby satisfy the "integer to multi-media" bypass latency.

TABLE 1

| | | | latency | | | | operands | |
|---|---|---|---|---|---|---|---|---|
| size | code | consume by | Itanium | McKinley | instrs | regs | upper 32 bits input | upper 32 bits result |
| 32*32 = 32 | mpy32x32.s Appendix 1 | I-unit MM-unit | 8 (10) 8 (10) | 7 (9) 8 (10) | 8 | 5 | don't care | garbage |
| 32*32 = 64 unsigned | mpy32x32_64u.s Appendix 2 | I-unit | 10 (12) | 9 (11) | 10 | 3 | don't care | |
| 32*32 = 64 signed | mpy32x32_64u.s Appendix 3 | I-unit | 10 (12) | 9 (11) | 22 | 6 Grs 2 preds | don't care | |
| 64*64 = 64 | mpy64x64_64.s Appendix 4 | I-unit | 12 (14) | 11 (13) | 23 | 9 | | |
| 32*32 = 64 unsigned | mpy_xmpy.s Code Segment A | I-unit | 19 | 15 | 4 | 2 FRs | zero | |
| 32*32 = 64 signed | (Prior Art) | I-unit | 19 | 15 | | | sign-extended | |
| 64*64 = 64 | | I-unit | 19 | 15 | | | | |

Note that in the present invention, the latencies for a McKinley CPU tend to be one clock cycle less than the latencies for an Itanium™ CPU. These difference are caused by the "nop" instructions required to avoid the multi-media-to-integer unit 10 cycle pipeline flush penalty that was discussed above. As mentioned above, this penalty is avoided in Appendix 1 because the multi-media parallel add instruction can be used for the 32-bit quantities. However, there is not a similar multi-media parallel add instruction available for the 64-bit quantities used in Appendixes 2, 3, and 4.

As mentioned above, the code segments shown in Appendixes 5 and 6 mirror the functionality of the code segments shown in Appendixes 1 and 3, but are optimized for the situation where the input operands are produced by integer instructions in instruction cycles immediately preceding the code segments.

As in Appendix 3, Appendix 6 includes code required to multiply two signed 32-bit values to produce a signed 64-bit result. The signed values are stored in a 2's complement format. Note that the "shl" instruction at line 680 is actually a substituted by the with a deposit instruction because the shift is 32-bits. Accordingly, the "shl" instruction will be compiled as an integer instruction.

Table 2 below compares the latencies and resources associated with the embodiments of the present invention shown in Appendixes 5 and 6, and the prior art multiplication code shown in Code Segment A. The latencies shown in Table 2 assume that the input operands have been produced by an integer instruction in the instruction cycle immediately preceding the code segment.

For Appendixes 5 and 6, all latencies shown assume that the result will be consumed by an integer instruction. If the result is to be consumed by a multi-media instruction, two cycles must be added to satisfy the bypass latency.

TABLE 2

| | | latency | | | | operands | |
|---|---|---|---|---|---|---|---|
| size | code | Itanium | McKinley | instrs | regs | upper 32 bits input | upper 32 bits result |
| 32*32 = 32 | mpy32x32.s Appendix 5 | 9 | 8 | 8 9 zero-ext | 5 | don't care | garbage zero |
| 32*32 = 64 signed | mpy32x32_64s.s Appendix 6 | 12 | 11 | 17 | 4 Grs 1 preds | don't care | |
| 32*32 = 64 unsigned | mpy_xmpy.s Code Segment A | 19 | 15 | 4 | 2FRs | zero | |
| 32*32 = 64 signed | (Prior Art) | 19 | 15 | | | sign-extended | |
| 64*64 = 64 | | 19 | 15 | | | | |

As in Appendix 1, Appendix 5 includes IA-64 code that performs a 32-bit by 32-bit multiply operation that produces a 32-bit result. However, the code of Appendix 5 includes an As in Table 1, in the present invention the latencies for a McKinley CPU tend to be one clock cycle less than the latencies for an Itanium™ CPU. These difference are caused by the "nop" instructions required to avoid the multi-media-to-integer unit 10 cycle pipeline flush penalty that was discussed above.

Compare the latencies for the code segments of Appendixes 5 and 6 in Table 2 with the latencies in parenthesis for the code segments of Appendixes 1 and 3, respectively, in Table 1. This is an "apples to apples" comparison because both sets of latency numbers assume that the input operands have been produced by an integer instruction in the instruction cycle immediately preceding the code segment.

Compared to the code of Appendix 1, the code of Appendix 5 requires one less cycle. The number of instructions and registers consumed is the same for the non-zero-extended version of the code of Appendix 5, while the zero-extended version requires an additional instruction.

Note that the code segment of Appendix 6 has the same latencies as the code segment of Appendix 3 (input operands have been produced by an integer instruction in the instruction cycle immediately preceding the code segment), but uses significantly fewer instructions and registers, thereby freeing these resources to be used to execute other instructions.

Tables 1 and 2 illustrate several interesting properties of the present invention. In every case, the present invention achieves better latencies than the prior art method of performing integer multiply operations provided by the IA-64 architecture, as shown in Code Segment A. However, in every case, the number of instructions and registers required by the present is greater than that required by the prior art.

Accordingly, if longer latencies can be tolerated (through modulo-scheduling, for example), then the best algorithm is the prior art algorithm shown in Code Segment A because this algorithm uses the fewest instructions. However, if latency is critical, then the present invention is preferred. On an Itanium™ CPU, the present invention provides a latency improvement of up to 58% for a full 32-bit integer multiply operation, and up to a 37% improvement for a full 64-bit integer multiply operation, compared to the prior art method illustrated in Code Segment A above.

Also note that the method of the prior art and the method of the present invention are not mutually exclusive, and can be scheduled to execute concurrently. Therefore, the present invention has the ability to increase the integer multiplication band width of an IA-64 CPU.

The present invention can also provide an improvement in power consumption, which is especially important in applications such as laptop computers. Typically, the floating-point unit uses a lot of power, and if a program does no real floating point work, IA-64 CPUs power down the floating-point unit. Therefore, powering the floating-point unit up for an occasional integer multiply operation consumes significant power. The present invention can perform a 32-bit or 64-bit multiply operation without powering up the floating-point unit.

The present invention does not use any circuits that are dedicated exclusively to 32-bit or 64-bit integer multiply operations. Since all of the circuits used by the present invention have other multi-media functions, these circuits are more generally useful and therefore provide a better balanced CPU design. Since minimizing die area is essential to achieving higher CPU clock frequencies, and therefore higher performance, it is always desirable to include as few circuits as possible, with each circuit providing as much functionality as possible.

The present invention has been described herein with reference to the instruction sequences shown in Appendixes 1–6. However, note that the present invention could also be implemented via microcode, with a single instruction being defined to invoke a code sequence in microcode analogous to the instructions of each of the appendixes.

Although the present invention has been described with reference to preferred embodiments, workers skilled in the art will recognize that changes may be made in form and detail without departing from the spirit and scope of the invention.

APPENDIX 1

```
        .text
        .proc mpy32x32
// Say we want to multiply z=x*y, where all of them are 32-bit integers
// (signed or unsigned - it doesn't matter since we're only going to get
// the low 32-bits of the product).
//
// Here's some notation:
//
// Let's depict the 64-bits of a register as being composed of 4 16-bit
// fields as follows:
//
//      reg:      | value3 | value2 | value1 | value0 |
//
// Let's name the 16-bit halfwords in the source operands as follows:
//
//    rx: |       |       |   a   |   b   |
//
//    ry: |       |       |   c   |   d   |
//
// And now, a bit of notation about multiplication. If we multiply two
// 16-bit values, say b and d, we get a 32-bit product. Let's think of
// the product as being composed of two 16-bit parts, the high part,
// which we'll denote with BD, and the low part, which we'll denote with
// bd.
//
// One more thing to note is that to get the sequence as short as
// possible, we assume that the upper 32 bits of both operands contain
// garbage, and that the upper 32 bits of the result can also be garbage.
// If the upper 32 bits of result must be 0- or sign-extended, an additional
// extract instruction is required, adding 1 cycle.
//
```

APPENDIX 1-continued

```
// So, based on this, our input operands look like this:
//
// rx:   |    X    |    X    |    a    |    b    |
//
// ry:   |    X    |    X    |    c    |    d    |
//
// where the halfwords with "X" are don't cares.
//
// The result we want to end up with is:
//
// rz:   |    X    |    X    |ad+bc+BD|    bd    |
// Here's a register allocation using 5 registers:
//   Virt Phys      Lifetime
     rx = r32       //  - 4
     ry = r33       //  - 3a
     rz = r8        // 7 -
     t1 = r8        // 1a - 3b
     t2 = r9        // 1b - 3a
     t3 = r10       // 2 - 4
     t4 = r9        // 3a - 6
     t5 = r8        // 3b - 6
     t6 = r10       // 4 - 7
     t7 = r8        // 6 - 7
// Now for the code, which totals 8 instructions:
//      .align    32
mpy32x32::
// cycle 0 and 1
        pmpyshr2.u  t1 = rx,ry,16      //  |   X   |   X   |  AC   |  BD   | I0
        mux2        t2 = rx,0xE0       //  |   X   |   X   |   b   |   b   | Ix
        ;;
// cycle 1 and 2
        unpack2.1   t3 = ry,r0         //  |   X   |   0   |   d   |   0   | Ix
        ;;
// cycle 2, 3, [4, (5)]
        pmpyshr2.u  t4 = t2,ry,0       //  |   X   |   X   |  bc   |  bd   | I0
        unpack2.1   t5 = t1,r0         //  |  AC   |   0   |  BD   |   0   | Ix
        ;;
// cycle 3, 4, [5, (6)]
        pmpyshr2.u  t6 = rx,t3,0       //  |   X   |   0   |  ad   |   0   | I0
        ;;
#ifdef MM_RESULT
// cycle 4 and 5
        padd2       t7 = t4,t5         //  |   X   |   X   | bc+BD |  bd   | A
        ;;
// cycle 6 and 7
        padd2       rz = t6,t7         //  |   X   |   X   |ad+bc+BD  bd   | A
*else /* !MM_RESULT */
#ifdef ITANIUM
// cycle 4 (Itanium-only-avoids 10-cycle MM to I pipeline flush)
        nop         0xbeef
        ;;
// cycle 6 (Itanium-only)
        nop         0xbeef
        ;;
#endif /* ITANIUM */
// cycle 5 (6)
        add         t7 = t4,t5         //  |   X   |   X   | bc+BD |  bd   | A
        ;;
// cycle 6 (7)
        add         rz = t6,t7         //  |   X   |   X   |ad+bc+BD|  bd  | A
#endif
        br.ret.sptk rp
        ;;
// total latency: 7 (8) cycles, 9 (10) cycles if rx & ry are defined by an
// I instr in cycle "-1"
        .endp
```

APPENDIX 2

```
        .text
        .proc mpy32x32__64u
// Say we want to multiply z=x*y, where x and y are 32-bit unsigned
// integers and z is the unsigned 64-bit product.
//
```

APPENDIX 2-continued

```
// Here's some notation:
//
// Let's depict the 64-bits of a register as being composed of 4 16-bit
// fields as follows:
//
//      reg: |   value3   |   value2   |   value1   |   value0   |
//
// Let's name the 16-bit halfwords in the operands as follows:
//
//  rx: |        |        |   a    |   b    |
//
//  ry: |        |        |   c    |   d    |
//
// And now, a bit of notation about multiplication. If we multiply two
// 16-bit values, say b and d, we get a 32-bit product. Let's think of
// the product as being composed of two 16-bit parts, the high part,
// which we'll denote with BD, and the low part, which we'll denote with
// bd.
//
// One more thing to note is that this sequence makes no assumption
// about the contents of the upper 32 bits of either source operand.
//
// So, based on this, our input operands look like this:
//
//  rx: |   X    |   X    |   a    |   b    |
//
//  ry: |   X    |   X    |   c    |   d    |
//
// where the halfwords with "X" are don't cares.
//
// The result we want to end up with is:
//
//  rz: |   AC   |AD+BC+ac|ad+bc+BD|   bd   |
// Here's a register allocation using 3 registers:
//  Virt Phys        Lifetime       Lifetime
//                   Itanium        McKinley
    rx = r32         //  - 2a         - 2a
    ry = r33         //  - 3          - 3
    rz = r8          // 11 -         10 -
    t1 = r32         // 2a - 5       2a - 5
    t2 = r8          // 2b - 4       2b - 4
    t3 = r33         // 3 - 5        3 - 5
    t4 = r8          // 4 - 8        4 - 7b
    t5 = r32         // 5 - 9        5 - 8
*ifdef ITANIUM
    t6 = r8          // 8 - 10
    t7 = r33         // 7 - 11
#else // !ITANIUM
    t6 = r33         //              7a - 9
    t7 = r8          //              7b - 10
#endif
    t8 = r32         // 9 - 10       8 - 9
    t9 = r32         // 10 - 11      9 - 10
// Now for the code, which uses 10 instructions:
mpy32x32_64u::
// cycle 0 and 1
    mux2      t1 = rx,0x44   // |   a    |   b    |   a    |   b    | Ix
    mux2      t2 = ry,0x05   // |   d    |   d    |   c    |   c    | Ix
    ;;
// cycle 1 and 2
    mux2      t3 = ry,0x50   // |   c    |   c    |   d    |   d    | Ix
    ;;
// cycle 2, 3, [4, (5)]
    pmpyshr2.u  t4 = t1,t2,0  // |   ad   |   bd   |   ac   |   bc   | I0
    ;;
// cycle 3, 4, [5, (6)]
    pmpyshr2.u  t5 = t1,t3,16 // |   AC   |   BC   |   AD   |   BD   | I0
    ;;
#ifdef ITANIUM
// cycle 5, 6, 7, 8
    mix4.1    t7 = t5,t4     // |   AC   |   BC   |   ad   |   bd   | Ix
    ;;
// cycle 6
    dep.z     t6 = t4,16,32  // |   0    |   ac   |   bc   |   0    | I0
    ;;
#else // !ITANIUM
// cycle 5
    dep.z     t6 = t4,16,32  // |   0    |   ac   |   bc   |   0    | I0
```

APPENDIX 2-continued

```
// cycle 5, 6, 7
      mix4.1       t7 = t5,t4       //  |   AC    |    BC       |    ad       |  bd   | Ix
      ;;
#endif
// cycle 6 (7)
      dep.z        t8 = t5,16,32    //  |   0     |    AD       |    BD       |  0    | I0
      ;;
// cycle 7 (8)
      add          t9 = t6,t8       //  |   0     |    ac+AD    |    bc+BD    |  0    | A
      ;;
// cycle 8 (9)
      add          rz = t7,t9       //  |   AC    |  BC+ac+AD   |  ad+bc+BD   |  bd   | A
      br.ret.sptk rp
      ;;
// total latency: 9 (10) cycles, 11 (12) cycles if rx & ry are defined by an
// I instr in cycle "–1"
      .endp
```

APPENDIX 3

```
      .text
      .proc mpy32x32_64s
// Say we want to multiply z=x*y, where x and y are 32-bit signed
// integers and z is the 64-bit signed product.
//
// Here's sone notation:
//
// Let's depict the 64-bits of a register as being composed of 4 16-bit
// fields as follows:
//
//      reg:   | value3   | value2   | value1   | value0   |
//
// Let's name the 16-bit halfwords in the operands as follows:
//
//   rx:    |         |         |    a    |    b    |
//
//   ry:    |         |         |    c    |    d    |
//
// And now, a bit of notation about multiplication. If we multiply two
// 16-bit values, say b and d, we get a 32-bit product. Let's think of
// the product as being composed of two 16-bit parts, the high part,
// which we'll denote with BD, and the low part, which we'll denote with
// bd.
//
// We will also treat x and y as if they were unsigned values, and
// then apply a ccrrection if either of them were negative.
//
// One more thing to note is that this sequence makes no assumption
// about the contents of the upper 32 bits of either input operand.
//
// So, based on this, our input operands look like this:
//
//   rx:    |    X    |    X    |    a    |    b    |
//
//   ry:    |    X    |    X    |    c    |    d    |
//
// where the halfwords with "X" are don't cares.
//
// The partial result we want to end up with is:
//
//   rt:    |   AC    |AD+BC+ac|ad+bc+BD|   bd    |
//
// Then we'll apply the correction. If either of x or y are negative,
// we subtract the other one from the upper half of the partial
// result. If both are negative, we subtract both.
//
// If x is negative and y is positive:
//
//   rz:    |  AC-c   |AD+BC+ac-d|ad+bc+BD|   bd    |
//
// If x is positive and y is negative:
//
//   rz:    |  AC-a   |AD+BC+ac-b|ad+bc+BD|   bd    |
//
```

APPENDIX 3-continued

```
// If both x and y are negative:
//
//   rz:  |  AC-a-c    |AD+BC+ac-b-d|ad+bc+BD|    bd       |
// Here's a register allocation using 6 GRs and 2 predicates:
//   Virt Phys    Lifetime
     rx = r32      //  - 2b
     ry = r33      //  - 2c
     rz = r8       // 9 -
     t1 = r8       // 1b - 4
     t2 = r9       // 1c - 4
     t3 = r32      // 2b - 6a
     t4 = r33      // 2c - 5a
     t5 = r10      // 3a - 5a - 6a - 7d
     t6 = r11      // 3b - 6c
     t7 = r8       // 4 - 7c
     t9 = r33      // 5b - 7a
     t10 = r9      // 5c - 7c
     t12 = r32     // 6b - 7d
     t13 = r11     // 6c - 7a
     t14 = r33     // 7a - 8b
     t15 = r11     // 7b - 8a
     t16 = r8      // 7c - 8b
     t17 = r32     // 7d - 8a
     t18 = r32     // 8a - 9
     t19 = r33     // 8b - 9
     px = p15      // 1a - 5a
     py = p14      // 2a - 6b
// Now for the code, which uses 22 instructions:
mpy32x32_64s::
// cycle 0
     cmp4.lt      px = rx,r0        // px = (x<0)        A
// and 1
     mux2         t1 = rx,0x44      //  |   a    |   b    |   a    |   b    | Ix
     mux2         t2 = ry,0x50      //  |   c    |   c    |   d    |   d    | Ix
     ;;
// cycle 1
     cmp4.lt      py = ry,r0        // py = (y<0)        A
     shl          t3 = rx,32        //  |   a    |   b    |   0    |   0    | I0
// and 2, 3, (4)
     mix4.r       t4 = ry,r0        //  |   c    |   d    |   0    |   0    | Ix
     ;;
// cycle 2
     mov          t5 = 0            // initial correction factor    A
// and 3, 4, (5)
     pmpyshr2.u   t6 = t1,t2,0      //  |   ac   |   bc   |   AC   |   bd   | I0
     ;;
// cycle 3, 4, 5, (6)
     pmpyshr2.u   t7 = t1,t2,16     //  |   AC   |   BC   |   AD   |   BD   | I0
     ;;
#ifdef ITANIUM
// cycle 4 (Itanium-only - avoids 10-cycle MM to I pipeline flush)
     nop.f        0xbeef
     ;;
#endif
// cycle 4 (5)
(px) add          t5 = t5,t4        // add correction factor for x negative  A
     mov          t9 = -0xFFFF      //  | FFFF   | FFFF   | FFFF   |   0    | A
     dep.z        t10 = -1,0,32     //  |   0    |   0    | FFFF   | FFFF   | I0
     ;;
// cycle 5 (6)
(py) add          t5 = t5,t3        // add correction factor for y negative  A
     and          t12 = t6,t10      //  |   0    |   0    |   ad   |   bd   | A
     shr.u        t13 = t6,16       //  |   0    |   ac   |   bc   |   ad   | I0
     ;;
// cycle 6 (7)
     and          t14 = t13,t9      //  |   0    |   ac   |   bc   |   0    | A
     dep.z        t15 = t7,16,32    //  |   0    |   AD   |   BD   |   0    | I0
     andcm        t16 = t7,t10      //  |   AC   |   BC   |   0    |   0    | A
     sub          t17 = t12,t5      // subtract correction factor   A
     ;;
// cycle 7 (8)
     add          t18 = t17,t15     //  |   0    |   AD   | BD+ad  |   bd   | A
     add          t19 = t14,t16     //  |   AC   | BC+ac  |   bc   |   0    | A
     ;;
// cycle 8 (9)
     add          rz = t18,t19      //  |   AC   |AD+BC+ac|BD+ad+bc|   bd   | A
     br.ret.sptk  rp
     ;;
```

APPENDIX 3-continued

// total latency: 9 (10) cycles, 11 (12) cycles if rx & ry are defined by an
// I instr in cycle "−1"
    .endp

APPENDIX 4

```
        .text
        .proc mpy64x64
// Say we want to multiply z=x*y, where all of them are 64-bit integers
// (signed or unsigned - it doesn't matter since we're only going to get
// the low 64-bits of the product).
//
// Here's some notation:
//
// Let's depict the 64-bits of a register as being composed of 4 16-bit
// fields as follows:
//
//      reg:   |   value3   |   value2   |   value1   |   value0   |
//
// Let's name the 16-bit halfwords in the operands as follows:
//
//      rx:    |     a      |     b      |     c      |     d      |
//
//      ry:    |     e      |     f      |     g      |     h      |
//
// And now, a bit of notation about multiplication. If we multiply two
// 16-bit values, say a and e, we get a 32-bit product. Let's think of
// the product as being composed of two 16-bit parts, the high part,
// which we'll denote with AE, and the low part, which we'll denote with
// ae.
//
// So, based on this, our input operands look like this:
//
//      rx:    |     a      |     b      |     c      |     d      |
//
//      ry:    |     e      |     f      |     g      |     h      |
//
// The result we want to end up with is:
//
//      rz:    |BH+ah+CG+bg+DF+cf+de|CH+bh+DG+cg+df|DH+ch+dg|     dh     |
// Here's a register allocation using 9 registers:
//      Virt  Phys      Lifetime
        rx = r32        //   - 8a
        ry = r33        //   - 5b
        rz = r8         // 12 -
        t1 = r8         // 2a - 6a
        t2 = r9         // 2b - 6a
        t3 = r10        // 3a - 7b
        t4 = r11        // 3b - 9a
        t5 = r2         // 3c - 5a
        t6 = r3         // 4  - 8b
        t7 = r2         // 5a - 9a
        t8 = r33        // 5b - 8a
        t9 = r8         // 6a - 9b
        t10 = r9        // 6b - 9c
        t11 = r14       // 7a - 10b
        t12 = r10       // 7b - 10c
        t13 = r32       // 8a - 11b
        t14 = r33       // 8b - 9c
        t15 = r11       // 9a - 10c
        t16 = r8        // 9b - 10a
        t17 = r33       // 9c - 10a
        t18 = r33       // 10a - 11a
        t19 = r8        // 10b - 11a
        t20 = r9        // 10c - 11b
        t21 = r33       // 11a - 12
        t22 = r32       // 11b - 12
// Now for the code, which uses 23 instructions:
mpy64x64::
// cycle 0 and 1
        mux2    t1 = rx,0x24    //  |   d   |   b   |   c   |   d   |  Ix
        mux2    t2 = ry,0x95    //  |   f   |   g   |   g   |   g   |  Ix
        ;;
// cycle 1, 2, 3
        mov     t3 = 32         // shift amount for MM shl in cycle 5
```

APPENDIX 4-continued

```
// cycle 1
      dep.z       t4 = -1,48,16      //  |  FFFF      |  0       |  0     |  0   |  I0
// cycle 1 and 2
      mux2        t5 = ry,0xCA       //  |  e         |  —       |  f     |  f   |  Ix
      ;;
// cycle 2, 3, [4, (5)]
      pmpyshr2.u  t6 = t1,t2,16      //  |  DF        |  —       |  CG    |  DG  |  I0
      ;;
// cycle 3, 4, [5, (6)]
      pmpyshr2.u  t7 = t1,t5,0       //  |  de        |  —       |  cf    |  df  |  I0
// cycle 3, 4
      mux2        t8 = ry,0x00       //  |  h         |  h       |  h     |  h   |  Ix
      ;;
// cycle 4, 5, 6, (7)
      pmpyshr2.u  t9 = t1,t2,0       //  |  —         |  bg      |  cg    |  dg  |  I0
      shl         t10 = t6,t3        //  |  CG        |  DG      |  0     |  0   |  Ix
      ;;
// cycle 5, 6, 7, (8)
      pmpyshr2.u  t11 = rx,t8,16     //  |  —         |  BH      |  CH    |  DH  |  I0
      shl         t12 = t7,t3        //  |  cf        |  df      |  0     |  0   |  Ix
      ;;
// cycle 6, 7, 8, (9)
      pmpyshr2.u  t13 = rx,t8,0      //  |  ah        |  bh      |  ch    |  dh  |  I0
// cycle 6
      and         t14 = t6,t4        //  |  DF        |  0       |  0     |  0   |  A
      ;;
#ifdef ITANIUM
// cycle 7 (Itanium-only - avoids 10-cycle MM to I pipeline flush)
      nop.m       0xbeef
      ;;
#endif /* ITANIUM */
// cycle 7 (8)
      and         t15 = t7,t4        //  |  de        |  0       |  0     |  0   |  A
      shl         t16 = t9,16        //  |  bg        |  cg      |  dg    |  0   |  I0
      add         t17 = t10,t14      //  |  CG+DF     |  DG      |  0     |  0   |  A
      ;;
// cycle 8 (9)
      add         t18 = t16,t17      //  |bg+CG+DF    |  cg+DG   |  dg    |  0   |  A
      shl         t19 = t11,16       //  |  BH        |  CH      |  DH    |  0   |  I0
      add         t20 = t12,t15      //  |  cf+de     |  df      |  0     |  0   |  A
      ;;
// cycle 9 (11)
      add         t21 = t18,t19      // |bg+CG+DF+BH|cg+DG+CH|  dg+DH    |  0   |  A
      add         t22 = t13,t20      //  |  ah+cf+de  |  bh+df   |  ch    |  dh  |  A
      ;;
// cycle 10 (11)
      add         rz = t21,t22       // |bg+CG+DF+BH|cg+DG+CH|dg+DH+ch|  dh  |  A
                                     //  |  +ah+cf+de |  bh+df   |        |      |
      br.ret.sptk rp
      ;;
// total latency: 11 (12) cycles, 13 (14) cycles if rx & ry are defined by an
// I instr in cycle "-1"
      .endp
```

APPENDIX 5

```
      .text
      .proc mpy32x32
// Say we want to multiply z=x*y, where all of them are 32-bit integers
// (signed or unsigned - it doesn't matter since we're only going to get
// the low 32-bits of the product).
//
// Here's some notation:
//
// Let's depict the 64-bits of a register as being composed of 4 16-bit
// fields as follows:
//
// reg:  |  value3  |  value2  |  value1  |  value0  |
//
// Let's name the 16-bit halfwords in the source operands as follows:
//
// rx:   |          |          |    a     |    b     |
//
// ry:   |          |          |    c     |    d     |
//
```

APPENDIX 5-continued

```
// And now, a bit of notation about multiplication. If we multiply two
// 16-bit values, say b and d, we get a 32-bit product. Let's think of
// the product as being composed of two 16-bit parts, the high part,
// which we'll denote with BD, and the low part, which we'll denote with
// bd.
//
// One more thing to note is that to get the sequence as short as
// possible, we assume that the upper 32 bits of both operands contain
// garbage, and that the upper 32 bits of the result can also be garbage.
// If the upper 32 bits of result must be 0-extended, #define ZERO_EXT,
// which adds an instruction but no cycles.
// If the upper 32 bits of result must be sign-extended, an additional
// extract instruction is required, adding 1 cycle.
//
// So, based on this, our input operands look like this:
//
//   rx:  |    X    |    X    |    a    |    b    |
//
//   ry:  |    X    |    X    |    c    |    d    |
//
// where the halfwords with "X" are don't cares (garbage).
//
// The result we want to end up with is:
//
//   rz:  |    0    |    0    | ad+bc+BD|   bd    |
// Here's a register allocation using 5 registers:
//   Virt  Phys    Lifetime
//                 ZERO_EXT     !ZERO_EXT
     rx = r32      //  - 4        - 4
     ry = r33      //  - 2        - 3
     rz = r8       // 7 -         7 -
#ifdef ZERO_EXT
     t1 = r8       // 0a - 3
#endif /* ZERO_EXT */
     t2 = r9       // 0b - 3      0b - 3
     t3 = r10      // 1 - 4       1 - 4
#ifdef ZERO_EXT
     t4 = r33      // 2 - 5
#else /* !ZERO_EXT */
     t4 = r8       //             2 - 5
#endif /* ZERO_EXT */
     t5 = r9       // 3 - 6       3 - 6
     t6 = r10      // 4 - 7       4 - 7
     t7 = r8       // 5 - 6       5 - 6
     t8 = r8       // 6 - 7       6 - 7
// Now for the code, which totals 8 instructions (9 for ZERO_EXT):
//       .align      32
mpy32x32::
// cycles assume rx & ry are defined by an I instr in cycle "-1"
// cycle 0
#ifdef ZERO_EXT
     addp4       t1 = ry,r0       // |   0   |   0   |   c   |   d   |  A
#endif /* ZERO_EXT */
     dep         t2 = rx,rx,16,16 // |   X   |   X   |   b   |   B   |  I0
     ;;
// cycle 1
     dep.z       t3 = ry,16,16    // |   0   |   0   |   d   |   0   |  I0
     ;;
// cycle 2, 3, 4, (5)
     pmpyshr2.u  t4 = rx,ry,16    // |   X   |   X   |   AC  |   BD  |  I0
     ;;
// cycle 3, 4, 5, (6)
#ifdef ZERO_EXT
     pmpyshr2.u  t5 = t1,t2,0     // |   0   |   0   |   bc  |   bd  |  I0
#else /* !ZERO_EXT */
     pmpyshr2.u  t5 = ry,t2,0     // |   X   |   X   |   bc  |   bd  |  I0
#endif /* ZERO_EXT */
     ;;
// cycle 4, 5, 6, (7)
     pmpyshr2.u  t6 = rx,t3,0     // |   0   |   0   |   ad  |   0   |  I0
     ;;
#ifdef ITANIUM
// cycle 5 (Itanium-only - avoids 10-cycle MM to I pipeline flush)
     nop         0xbeef
     ;;
#endif /* ITANIUM */
// cycle 5 (6)
     dep.z       t7 = t4,16,16    // |   0   |   0   |   BD  |   0   |  I0
     ;;
```

APPENDIX 5-continued

```
// cycle 6 (7)
      add       t8 = t5,t7        //  |  0  |  0  | ad+BD  |  0  |  A
      ;;
// cycle 7 (8)
      add       rz = t6,t8        //  |  0  |  0  |bc+ad+BD|  bd |  A
      br.ret.sptk rp
      ;;
// total latency 8 (9) cycles if rx & ry are defined by an
// I instr in cycle "−1"
      .endp
```

APPENDIX 6

```
      .text
      .proc mpy32x3Z__64s
// Say we want to multiply z=x*y, where x and y are 32-bit signed
// integers and z is the 64-bit signed product.
//
// Here's some notation:
//
// Let's depict the 64-bits of a register as being composed of 4 16-bit
// fields as follows:
//
//   reg: |  value3  |  value2  |  value1  |  value0  |
//
// Let's name the 16-bit halfwords in the operands as follows:
//
//   rx:  |          |          |    a     |    b     |
//
//   ry:  |          |          |    c     |    d     |
//
// And now, a bit of notation about multiplication. If we multiply two
// 16-bit values, say b and d, we get a 32-bit product. Lets think of
// the product as being composed of two 16-bit parts, the high part,
// which we'll denote with BD, and the low part, which we'll denote with
// bd.
//
// We will also treat x and y as if they were unsigned values, and
// then apply a correction if either of them were negative.
//
// One more thing to note is that this sequence makes no assumption
// about the contents of the upper 32 bits of either input operand.
//
// So, based on this, our input operands look like this:
//
//   rx:  |    X     |    X     |    a     |    b     |
//
//   ry:  |    X     |    X     |    c     |    d     |
//
// where the halfwords with "X" are don't cares (garbage).
//
// The partial result we want to end up with is:
//
//   rt:  |    AC    |AD+BC+ac|ad+bc+BD|   bd     |
//
// Then we'll apply the correction. If either of x or y are negative,
// we subtract the other one from the upper half of the partial
// result. If both are negative, we subtract both.
//
// If x is negative and y is positive:
//
//   rz:  |   AC−c   |AD+BC+ac−d|ad+bc+BD|   bd     |
//
// If x is positive and y is negative:
//
//   rz:  |   AC−a   |AD+BC+ac−b|ad+bc+BD|   bd     |
//
// If both x and y are negative:
//
//   rz:  |AC−a−c    |AD+BC+ac−b−d|ad+bc+BD|  bd    |
// Here's a register allocation using 4 GRs and 1 predicate:
//   Virt Phys    Lifetime      Lifetime
//                Itanium       McKinley
      rx = r32    //  − 2a       − 2a
      ry = r33    //  − 3        − 3
      rz = r8     // 11 −        10 −
```

APPENDIX 6-continued

```
        t1 = r8        // 0b – 9b        0b – 8b
        t2 = r9        // 1a – 2b        1a – 2b
        t3 = r32       // 2a – 5         2a – 5
        t4 = r9        // 2c – 4         2c – 4
        t5 = r33       // 3 – 5          3 – 5
        t6 = r9        // 4 – 8          4 – 7b
        t7 = r32       // 5 – 9a         5 – 8a
#ifdef ITANIUM
        t8 = r9        // 8 – 9b
        t9 = r33       // 7 – 11
#else // !ITANIUM
        t8 = r33       //                7a – 8b
        t9 = r9        //                7b – 10
#endif
        t10 = r32      // 9a – 10        8a – 9
        t11 = r8       // 9b – 10        8b – 9
        t12 = r8       // 10 – 11        9 – 10
        px = p15       // 0a – 1b        0a – 1b
        py = p15       // 1c – 2b        1c – 2b
// Now for the code, which uses 17 instructions:
mpy32x32_64s::
// cycles assume rx & ry are defined by an I instr in cycle "–1"
// cycle 0
        cmp4.ge    px = rx,r0     // px = (x>=0)          A
        shi        t1 = ry,32     //  |  c  |  d  |  0  |  0  |  I0
        ;;
// cycle 1
        shl        t2 = rx,32     //  |  a  |  b  |  0  |  0  |  Ix
        (px) mov   t1 = 0         // update correction factor for x pos  A
        cmp4.lt    py = ry,r0     // py = (y<0)           A
        ;;
// cycle 2, 3
        mux2       t3 = rx,0x44   //  |  a  |  b  |  a  |  b  |  Ix
// cycle 2
        (py) add   t1 = t1,t2     // add correction factor for y negative  A
// cycle 2, 3
        mux2       t4 = ry,0x05   //  |  d  |  d  |  c  |  c  |  Ix
        ;;
// cycle 3, 4
        mux2       t5 = ry,0x50   //  |  c  |  c  |  d  |  d  |  Ix
        ;;
// cycle 4, 5, [6, (7)]
        pmpyshr2.u t6 = t3,t4,0   //  |  ad |  bd |  ac |  bc |  I0
        ;;
// cycle 5, 6, [7, (8)]
        pmpyshr2.u t7 = t3,t5,16  //  |  AC |  BC |  AD |  BD |  I0
        ;;
#ifdef ITANIUM
// cycle 6 (Itaniun-only - avoids 10-cycle MM to I pipeline flush)
        nop.i      0xbeef
        ;;
// cycle 7, 8, 9, 10
        mix4.1     t9 = t7,t6     //  |  AC |  BC |  ad |  bd |  Ix
        ;;
// cycle 8
        dep.z      t8 = t6,16,32  //  |  0  |  ac |  bc |  0  |  I0
        ;;
#else // !ITANIUM
// cycle 7
        dep.z      t8 = t6,16,32  //  |  0  |  ac |  bc |  0  |  I0
// cycle 7, 8, 9
        mix4.1     t9 = t7,t6     //  |  AC |  BC |  ad |  bd |  Ix
        ;;
#endif
// cycle 8 (9)
        dep.z      t10 = t7,16,32 //  |  0  |  AD |  BD |  0  |  I0
        sub        t11 = t8,t1    // subtract correction factor     A
        ;;
// cycle 9 (10)
        add        t12 = t11,t10  //  |  0  | ac+AD | bc+BD |  0  |  A
        ;;
// cycle 10 (11)
        add        rz = t9,t12    //  |  AC |BC+ac+AD|ad+bc+BD| bd |  A
        br.ret.sptk rp
        ;;
// total latency 11 (12) cycles if rx & ry are defined by an
// I instr in cycle "–1"
        .endp
```

What is claimed is:

1. A method of performing integer multiply operations on large integer operands having a first number of bit positions using multi-media instructions that only support parallel multiply operations for small operands having a second number of bit positions, wherein the first number is at least twice as large as the second number, the method comprising:

manipulating the large integer operands to position segments of the large integer operands into register positions used as source fields by the multi-media instructions;

executing a plurality of multi-media parallel multiply instructions to form a series of partial products; and adding the partial products together to produce an integer result having at least the first number of bit positions.

2. The method of claim 1 wherein the first number of bit positions is 32 or 64, and the second number of bit positions is 16.

3. The method of claim 1 wherein at least one of the plurality of multi-media parallel multiply instructions is a multi-media parallel multiply and shift right instruction.

4. The method of claim 1 and further comprising:

applying a correction to factor to the integer result if at least one of the large integer operands are negative to produce a signed integer result.

5. The method of claim 4 wherein the signed integer result is in 2's complement format.

6. The method of claim 1 wherein at least one of the plurality of multi-media parallel multiply instructions forms at least two partial products of the series of partial products.

7. A method of performing 32-bit and 64-bit integer multiply operations in a processor adhering to the IA-64 architecture comprising:

manipulating 32-bit or 64-bit input operands to position 16-bit segments of the 32-bit or 64-bit input operands into register positions used as source fields by multi-media multiply instructions that perform 16-bit multiply operations in parallel;

executing a plurality of multi-media parallel multiply instructions to form a series of partial products, with at least one multi-media parallel multiply instruction forming at least two partial products of the series of partial products; and adding the partial products together to produce a 32-bit or 64-bit integer result.

8. The method of claim 7 wherein at least one of the plurality of multi-media parallel multiply instructions is a multi-media parallel multiply and shift right instruction.

9. The method of claim 8 wherein the multi-media parallel multiply and shift right instruction is a pmpyshr2.u instruction.

10. The method of claim 7 and further comprising:

applying a correction to factor to a 64-bit integer result if either or both of the first of second 32-bit or 64-bit input operands are 32-bits and are negative, to produce a signed 64-bit integer result.

11. A computer program product, comprising:

at least one computer usable medium having computer readable code embodied therein for causing a CPU to perform integer multiply operations on large integer operands having a first number of bit positions using multi-media instructions that only support parallel multiply operations for small operands having a second number of bit positions, wherein the first number is at least twice as large as the second number, the computer program product including:

first computer readable program code devices configured to cause the CPU to manipulate the large integer operands to position segments of the large integer operands into register positions used as source fields by the multi-media instructions;

second computer readable program code devices configured to cause the CPU to execute a plurality of multi-media parallel multiply instructions to form a series of partial products; and third computer readable program code devices configured to cause the CPU to add the partial products together to produce an integer result having at least the first number of bit positions.

12. The computer program product of claim 11 wherein the first number of bit positions is 32 or 64, and the second number of bit positions is 16.

13. The computer program product of claim 11 wherein at least one of the plurality of multi-media parallel multiply instructions is a multi-media parallel multiply and shift right instruction.

14. The computer program product of claim 11 and further comprising:

fourth computer readable program code devices configured to cause the CPU to apply a correction to factor to the integer result if at least one of the large integer operands are negative to produce a signed integer result.

15. The computer program product of claim 14 wherein the signed integer result is in 2's complement format.

16. The computer program product of claim 11 wherein at least one of the plurality of multi-media parallel multiply instructions forms at least two partial products of the series of partial products.

17. A computer program product, comprising:

at least one computer usable medium having computer readable code embodied therein for causing a CPU to perform 32-bit and 64-bit integer multiply operations in a processor adhering to the IA-64 architecture comprising, the computer program product including:

first computer readable program code devices configured to cause the CPU to manipulate 32-bit or 64-bit input operands to position 16-bit segments of the 32-bit or 64-bit input operands into register positions used as source fields by multi-media multiply instructions that perform 16-bit multiply operations in parallel;

second computer readable program code devices configured to cause the CPU to execute a plurality of multi-media parallel multiply instructions to form a series of partial products, with at least one multi-media parallel multiply instruction forming at least two partial products of the series of partial products; and third computer readable program code devices configured to cause the CPU to add the partial products together to produce a 32-bit or 64-bit integer result.

18. The computer program product of claim 17 wherein at least one of the plurality of multi-media parallel multiply instructions is a multi-media parallel multiply and shift right instruction.

19. The computer program product of claim 18 wherein the multi-media parallel multiply and shift right instruction is a pmpyshr2.u instruction.

20. The computer program product of claim 17 and further comprising:

fourth computer readable program code devices configured to cause the CPU to apply a correction to factor to a 64-bit integer result if either or both of the first of second 32-bit or 64-bit input operands are 32-bits and are negative, to produce a signed 64-bit integer result.

* * * * *